United States Patent [19]
Ford

[11] 3,866,120
[45] Feb. 11, 1975

[54] DEVICES FOR MEASURING SHAFT R.P.M.
[75] Inventor: Eric Harold Ford, London, England
[73] Assignee: Lumenition Limited, London, England
[22] Filed: Apr. 3, 1974
[21] Appl. No.: 457,660

Related U.S. Application Data
[63] Continuation-in-part of Ser. No. 293,586, Sept. 29, 1972, abandoned.

[30] Foreign Application Priority Data
Oct. 6, 1971 Great Britain.................... 46479/71

[52] U.S. Cl................. 324/175, 324/78 D, 324/96, 235/92 FQ, 235/92 EA
[51] Int. Cl. ........................................... G01p 3/48
[58] Field of Search .......... 324/161, 166, 169, 170, 324/172–175, 99 D, 78 D, 96, 122, 133, 79 D; 235/92 EA, 92 FQ, 92 DN, 92 TF, 92 AE; 307/311; 340/168 SR, 325, 379

[56] References Cited
UNITED STATES PATENTS
3,619,574  11/1971  Mindheim...................... 324/96 UX
3,746,988  7/1973  Ford ................................. 324/175

OTHER PUBLICATIONS
E. Bukstein, Industrial Electronics Measurement And Control, Bobbs–Merrill, Sept. 1961, pp. 72, 73, 79–82.

*Primary Examiner*—Michael J. Lynch
*Attorney, Agent, or Firm*—Larson, Taylor & Hinds

[57] ABSTRACT

In a device for measuring shaft R.P.M. accurately even if the latter changes rapidly, a voltage having a square waveform whose mark space ratio is constant at any engine speed is passed to a gate which is "open" for a predetermined time. The square waveform can be considered as a string of pulses, which are produced by regular interruption of a steady voltage by a device operable in synchronism with the engine revolutions, with the result that in the predetermined time the gate passes a number of pulses proportional to the shaft R.P.M. to be measured and then ceases passisng the pulses. A ring counter or shift register counts the number of pulses passed by the gate, and display means indicates the shaft R.P.M. visually.

11 Claims, 8 Drawing Figures

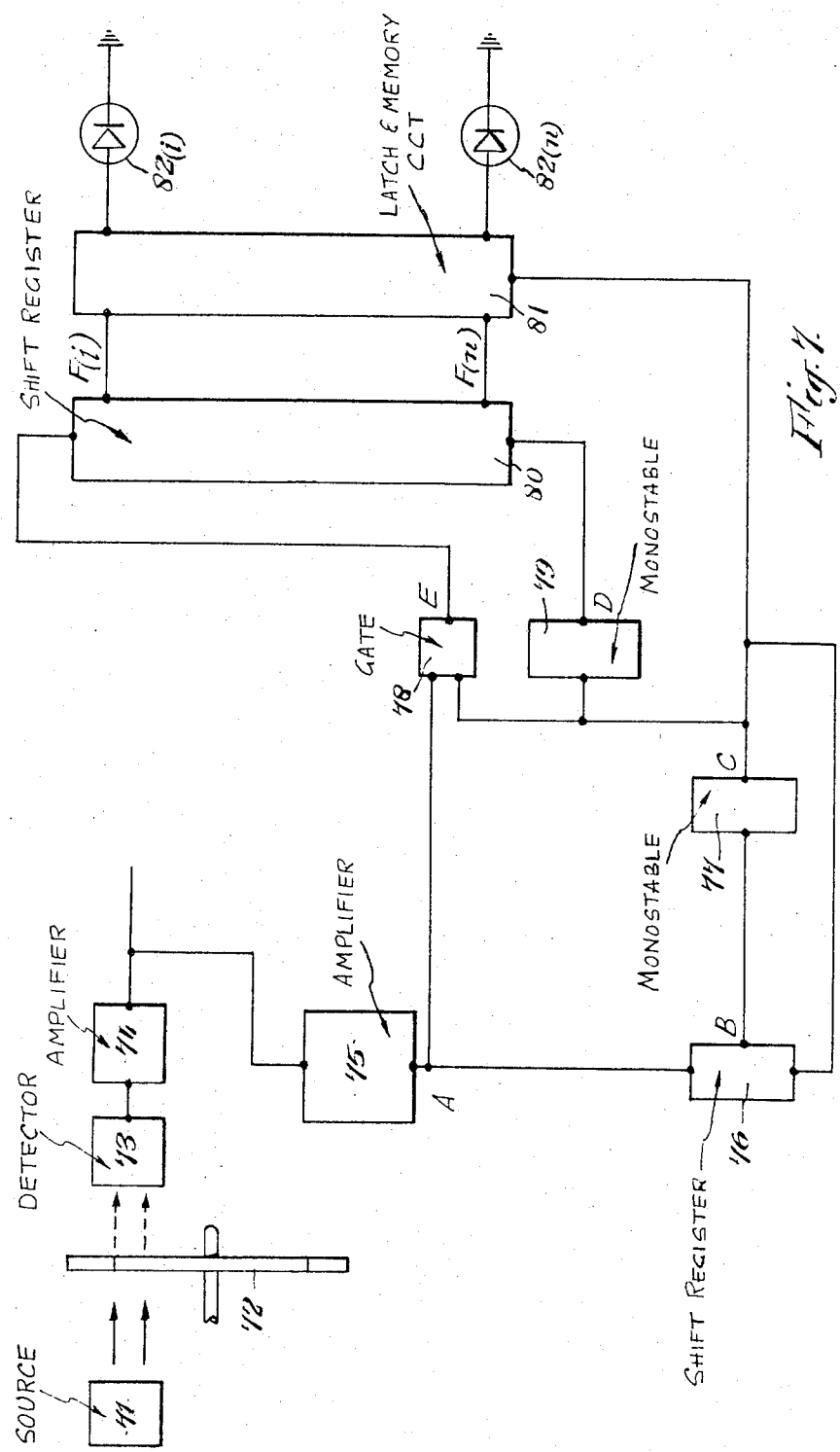

A 
B 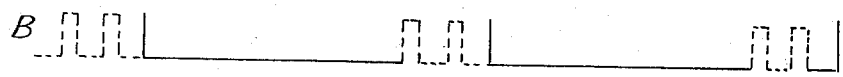
C 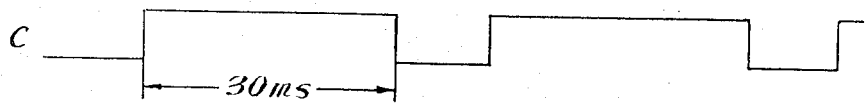
←—30ms—→
D 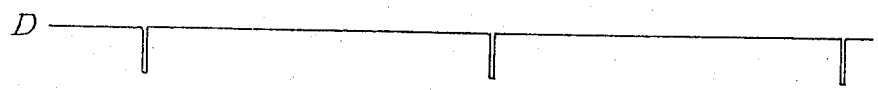
E 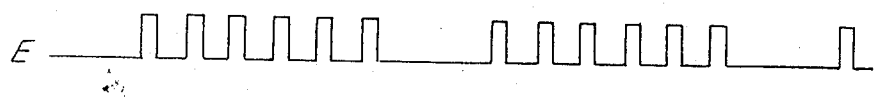
F(1) 
F(2) 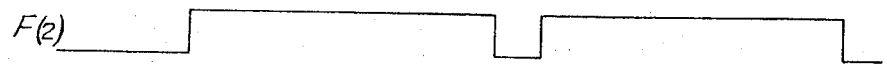
F(3) 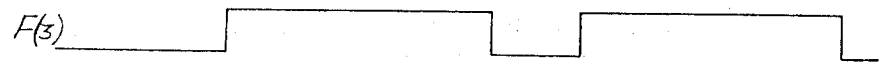
F(n) 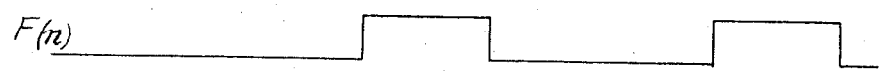
*Fig. 8.*

DEVICES FOR MEASURING SHAFT R.P.M.

CROSS REFERENCE

This application is a continuation-in-part application to my application Ser. No. 293,586 filed on Sept. 29, 1972, now abandoned, and entitled "Devices for measuring engine R.P.M."

BACKGROUND OF THE INVENTION

The present invention relates to a device for measuring shaft R.P.M., and in particular to engine R.P.M. of an automobile.

The conventional way of measuring engine R.P.M. in an automobile is to connect a cable, by means of gears, between the drive shaft from the engine to a speedometer of conventional form. All mechanical methods of measuring engine R.P.M. suffer from the disadvantage of wear which will produce ultimate failure. Furthermore, mechanical methods are inaccurate when engine R.P.M. changes rapidly owing to the inertia of the meter employed. Thus sudden fluctuations in engine R.P.M. cannot be faithfully followed by any mechanical system. To meet these defects, electronic systems have been proposed.

DESCRIPTION OF THE PRIOR ART

One such electronic system which is capable of measuring shaft R.P.M. is disclosed in U.S. Pat. No. 3,619,574. This system involves the use of a digital meter with an auxiliary visual analog display. The digital meter disclosed comprises a series of decimal counting units, a corresponding plurality of Nixie tubes each giving a multi-digit digital display of the count registered by the corresponding decimal counter unit, and an analog display giving an auxiliary display of the registered count.

It is also known to use an opto-electronic device for generating a series of pulses using either a disc having a plurality of equi-spaced blades, or a plurality of equi-spaced apertures, arranged concentrically with respect to the axis of rotation of the disc. Such a system is disclosed in an article by E. Bukstein in the periodical publication "Industrial Electronics Measurement and Control," Sept. 1961, pp 72–82. In the Bukstein system, a series of impulses is first squared up in a pulse shaping circuit and then passed to a flip-flop device in the form of a gate. The output of the gate is applied to a series of counting devices which display the count in decimal fashion.

Furthermore, I have already disclosed in my U.S. Pat. No. 3,746,988 a device for generating and utilizing voltage pulses for determining the R.P.M. of a rotating shaft. The device includes a solid state radiation source, a semi-conductor element sensitive to the radiation and an opaque member having an aperture therein to permit radiation to reach the semi-conductor element for generating a voltage pulse, the opaque element being driven in synchronism with the rotating shaft, whereby by fast switching and electronic summation of the voltage pulses, the R.P.M. of the shaft or engine can be determined.

SUMMARY OF THE INVENTION

It is an object of the present invention to utilize a part of the device disclosed in my U.S. Pat. No. 3,746,988 to generate a series of square wave pulses in synchronism with the shaft or engine R.P.M., and to provide an electronic system whereby an accurate indication of the actual speed can be instantaneously displayed.

According to one aspect of the present invention there is provided a device for measuring shaft R.P.M. including: means for generating a voltage of square waveform, having two voltage states and a constant mark space ratio, in synchronism with the shaft revolutions; gate means which cyclically opens to allow passage of the pulses for a predetermined time period irrespective of the speed of rotation of the shaft; a ring counter for counting the pulses passing through the gate in said predetermined time and providing a plurality of outputs; a plurality of visible diodes arranged in equi-spaced relation from one to the next; and means for connecting said diodes to respective outputs from the ring counter so that the diodes are switched on in sequence from said outputs in accordance with the pulses counted during the time which said gate is open and are switched off again as soon as the next diode in the sequence has been lit so as to cause a line of diodes to appear continuously lit during the cyclic operation, whereby the length of the line of lit diodes is proportional to the shaft R.P.M.

According to another aspect of the present invention there is provided a device for measuring shaft R.P.M. including: means for generating a voltage of square waveform, having two voltage states and a constant mark space ratio, in synchronism with the shaft revolutions; gate means which is cyclically opened to allow the passage of pulses for a predetermined time irrespective of the speed of rotation of the shaft; means for opening said gate after a given number of pulses following the closing of the gate; means for counting the pulses passing through the gate in a predetermined time and providing a plurality of outputs; a memory circuit for storing the outputs from the counting means; a plurality of visible diodes arranged in equi-spaced relation from one to the next; means for cyclically reading out from the memory circuit the stored plurality of outputs whereby a line of diodes is lit, the length of which is proportional to the shaft R.P.M.

BRIEF DESCRIPTION OF DRAWINGS

The present invention will now be described in greater detail by way of example with reference to the accompanying drawings, wherein:

FIG. 5 is a detailed circuit diagram of one of the amplifiers connected to an output of the ring counter shown in FIG. 1;

FIG. 6 shows two graphs which assist in explaining the operation of the device shown in FIG. 1;

FIG. 7 is a block schematic diagram of a second preferred form of device for measuring engine R.P.M.; and FIG. 8 is a set of waveforms which assist in explaining the operation of the device shown in FIG. 7.

DESCRIPTION OF THE PREFERRED EMBODIMENTS

Figure 1:
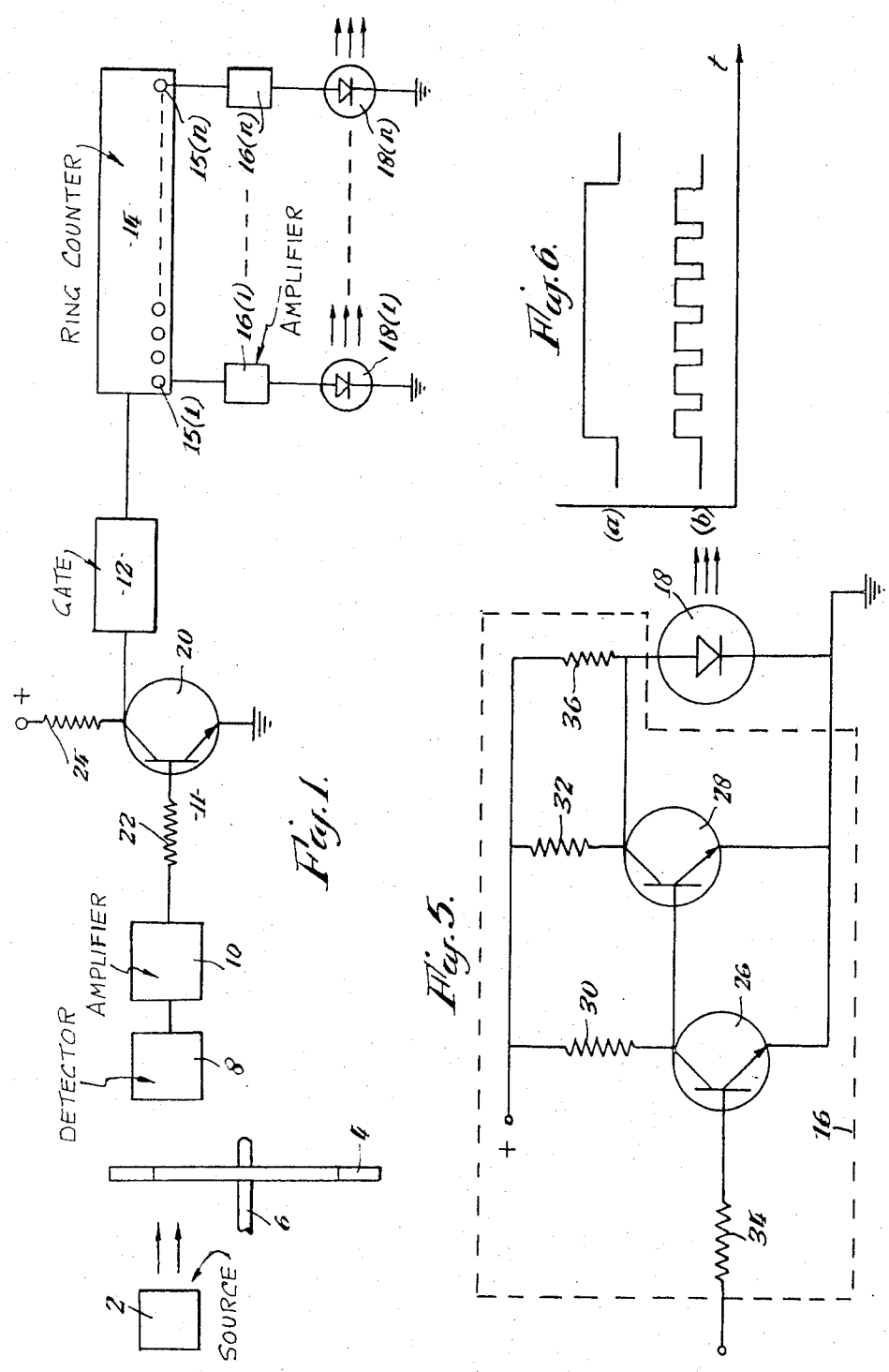
FIG. 1 is a schematic block diagram of one preferred form of device for measuring engine R.P.M.

Referring to FIG. 1, the device includes a source of electro-magnetic radiation 2 which is preferably a gallium arsenide lamp emitting radiation in the infra-red region of the electro-magnetic spectrum; a radiation chopper disc 4 mounted on a shaft 6 driven in synchronism with the engine at camshaft speed; an electro-magnetic radiation detector 8, which is preferably a photo-transistor or a photodarlington pair; a fast inverse switching amplifier 10; an isolating stage 11; a clock-operated gate 12; a ring counter 14; amplifiers 16(1) to 16(n) connected to each of the n outputs from the ring counter 14; and a series of visible diodes 18(1) to 18(n) preferably gallium phosphide lamps, connected to respective amplifiers 16(1) to 16(n).

Figure 2:
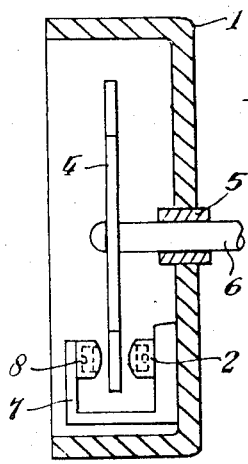
FIG. 2 is a cross-sectional view of one preferred form of device for providing voltage pulses in synchronism with the engine revolutions.
Figure 3:
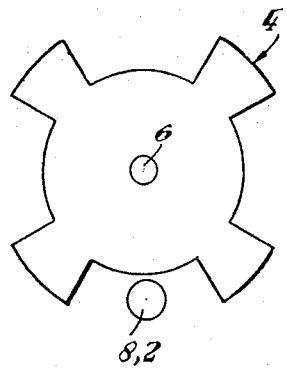
FIG. 3 is a front view of the chopper disc used in the device shown in FIG. 2.

Referring now to FIGS. 2 and 3, the device for providing voltage pulses in synchronism with the engine revolutions includes a casing 1 in the form of a cylindrical cup having a central aperture in which a bearing 5 is housed. The chopper disc 4 which is in the form of a maltese cross is mounted on a shaft 6 which is driven from the camshaft of the engine and supported by the bearing 5. On the casing 1 is mounted a U-shaped bracket 7 which houses at the extremities of the U, the gallium arsenide lamp 2 and the photo-transistor 8, these two elements being arranged to face each other across a gap in which the outer edge of the chopper disc 4 moves.

The chopper disc 4, which as shown, is in the form of a maltese cross, is designed to give an "ON" period of 60° and an "OFF" period of 30° of camshaft revolution. It will be appreciated that the mark space ratio of such an output will be 2:1 and that it will be constant irrespective of the revolutions per minute of the engine.

The device shown in FIGS. 2 and 3 is designed for a 4 cylinder engine and is also used to provide a separate output for the ignition system of the engine as disclosed in U.S. Pat. No. 3,605,712. It will be appreciated that for an n cylinder engine, there will be n slots in the chopper disc 4.

The isolating stage 11, which is positioned between the fast inverse switching amplifier 10 and the clock-operated gate 12 consists of a transistor 20 and base and collector resistors 22 and 24 respectively.

Figure 4:
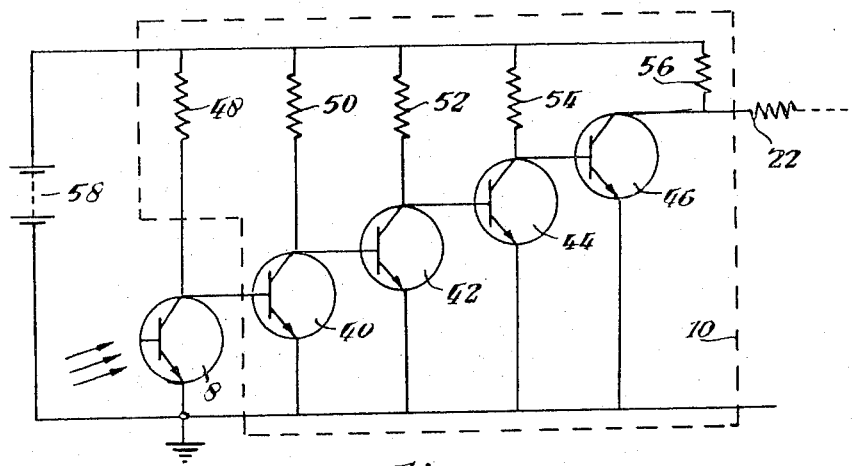
FIG. 4 is a circuit diagram of one preferred form of fast inverse switching trigger.

Referring next to FIG. 4, the fast inverse switching trigger includes a series of transistors 40, 42, 44 and 46 arranged in cascade to switch in inverse relation to one another. The output from the collector electrode of the photo-transistor 8 is connected to the base electrode of the first transistor 40. Each stage of the trigger is arranged such that the output from the collector electrode is applied direct to the base electrode of the next transistor. All the emitter electrodes are earthed and the collector electrodes of the photo-transistor 8 and of the respective transistors 40 to 46 are connected to the positive terminal of a battery 58 through respective resistors 48, 50, 52, 54 and 56. The output from the collector electrode 46 is connected to the resistor 22 in the isolating stage 11.

Each amplifier 16(1) to 16(n) consists of a pair of transistors 26 and 28 whose emitter electrodes are earthed and whose collector electrodes are connected to a positive voltage through respective resistors 30 and 32. The two transistors 26 and 28 are arranged to switch in inverse relation to one another. A resistor 34 connects the base electrode of the first transistor 26 to one of the outputs 15(1) to 15(n) of the ring counter 14. A resistor 36 is connected in series with a visible diode 18 between the positive voltage and earth. The output voltage appearing on the collector electrode of the transistor 28 is applied to the anode of the diode 18.

When no voltage pulse is present on an output 15 of the ring counter 14, the transistor 26 is non-conducting and the transistor 28 is fully saturated in the on state. This means that there is no voltage across the diode 18 so that it is not lit. When a voltage pulse appears at the output 15, the two transistors switch to their respective opposite mode, and the diode 18 is then fed with current through the resistor 36 and remains lit as long as the voltage pulse is present at the output 15.

In a preferred form, the ring counter 14 has 30 outputs 15. The clock-operated gate 12 has its timing so adjusted that at maximum engine R.P.M., the gate 12 remains open long enough to allow 30 pulses to pass to the ring counter 14. At engine speeds slower than maximum, a lower number of pulses reach the ring counter 14 before the gate closes. Referring to FIG. 6, graph (a) shows the time that the gate 12 is open. When the clock-operated gate is ready to open, i.e., after a predetermined time from when it last closed, the leading edge of the first incoming square wave to pass through the isolating stage 11 triggers the gate 12 into its open condition. It then stays open for the predetermined time. As shown in graph (b) of FIG. 6, six square wave pulses are permitted to pass through the gate 12, the seventh in the sequence being cut off. The ring counter 14 operates to apply voltage pulses in sequence beginning at its first output 15(1), the second pulse which has passed through the gate being applied to the second output 15(2) etc. These six pulses which pass through the gate 12 during the time it is open, are then amplified in the respective amplifiers 16(1) to 16(6) and the visible diodes 18(1) to 18(6) are lit in sequence. If these diodes 18(1) to 18(n) are arranged in a straight line or in a circle the repeated sequential operation of the diodes gives a persistent line or arc which directly indicates the R.P.M. of the engine.

Preferably, for domestic vehicles, each diode represents a speed increment of 250 R.P.M., so that with 30 diodes a maximum R.P.M. of 7,500 can be indicated. However, if a more accurate indication is required, double the number of lamps can be used. Also the range can be extended to measure R.P.M. in excess of 7,500 for sports and/or racing cars.

Referring now to the second embodiment disclosed in FIG. 7, the device as in the first embodiment includes a source 71 of infra-red radiation; a bladed interrupter 72 made of a material which is opaque to infra-red radiation; a detector 73 for detecting infra-red radiation which passes through the blades of the interrupter 72; and an inverse switching amplifier 74. The source 71 of infra-red radiation is preferably a gallium arsenide lamp and the detector 73 a photo-transistor which is sensitive to infra-red radiation. In the case of an eight cylinder engine the interrupter has eight equi-spaced blades. The fast inverse switching amplifier 74 has a plurality of transistors arranged in cascade, with their emitter electrodes all grounded, and with the output from the collector electrode directly feeding the base electrode of the next transistor in the cascaded chain. A suitable fast inverse switching amplifier has already been shown in FIG. 4 of the first embodiment.

The remaining part of the circuit includes a pulse shaping and amplifying circuit 75; a shift register 76; a first monostable circuit 77; an electronic gate element 78; a second monostable circuit 79; a main shift register 80; an electronic latch or memory circuit 81; and a row of visible diodes 82(1) to 82(n). The output from the inverse switching amplifier 74 is applied to the input of the pulse shaping and amplifying circuit 75. This circuit 75 amplifies the square wave output from the circuit 74 such that the "highs" and "lows" are compatible with the logic levels used in the rest of the circuit. The circuit 75 also eliminates any high frequency interference that might pass through the fast inverse switching amplifier 74.

The output of the circuit 75 is shown by waveform A of FIG. 8. It should be noted that in this particular example the levels of all the waveforms A to F shown on FIG. 8 are logic "low" = 0 volts
logic "high" = 5 volts The output from the circuit 75 as represented by waveform A is fed firstly to the input of the shift register 76, and secondly to one input of the electronic gate 78. The output from the shift register 76 is fed to the monostable circuit 77. The shift register 76 is arranged to give a "high" on the input of the monostable circuit 77 as the waveform A goes "high" for the third time. Thus, the output waveform from the shift register 76 is a series of spikes as shown in waveform B, these spikes initiating the output from the monostable circuit 77 to change from a "low" to a "high," as shown in waveform C. The object of utilizing the shift register 76 in the circuit is to give the monostable circuit 77 time to "reset" itself, this being done during the two missed pulses at the beginning of the cycle.

The output from the monostable circuit 77 is applied firstly to the electronic gate 78, secondly to the second monostable circuit 79, which acts to clear the main shift register 80, thirdly to the electronic latch or memory circuit 81, and fourthly as a reset input to the shift register 76. The waveform C representing the output of the monostable circuit 77 remains in the "high" state once it has triggered to this level by the spike of waveform B, for a predetermined time. In the case of an eight cylinder engine this predetermined time is for example 30 milliseconds for a breakerless ignition system employing only a single gallium arsenide lamp. This time is independent of the number of pulses per unit time of the waveform A since when the monostable circuit 77 is placed in its unstable state, in which its output is a "high" the shift register 76 is reset thus removing the input to the monostable circuit so that it can revert to its stable state after the 30 millisecond lapse of time.

The output from the monostable circuit 77 opens the gate 78 to allow the square wave output pulses from the circuit 75 to pass into the main shift register 80. Waveform E shows the chain of pulses applied to the main shift register 80 during the 30 millisecond interval that the gate 78 is open.

The output from the monostable circuit 77 also triggers the second monostable circuit 79 whose function is to clear the main shift register 80. Waveform D shows the negative going spike produced at the output of the second monostable circuit 79 when triggered by the monostable circuit 77. This negative going spike is applied to the opposite end of the shift register 80 in order to clear it simultaneously with the beginning of the first pulse from the electronic gate 78, which has been opened simultaneously with the triggering of the second monostable circuit 79.

The latch or memory circuit 81 is held closed by the waveform C which does not permit the light emitting diodes 82(1) to 82(n) to count with the main shift register 80. When the output of the monostable circuit 77 reverts to a "low" the latches of the memory circuit 81 are opened and the appropriate number of light emitting diodes are illuminated according to the number of pulses of the waveform A which have been stored in the main shift register 80.

On the third pulse after the monostable circuit 77 has reverted to its stable state, it is again triggered to its unstable state from the output of the shift register 76. This shuts the latches of the memory circuit 81, and the main shift register 80 is cleared to enable the count sequence to start again.

Waveforms F(1) to F(n) show the outputs of the main shift register 80 to the memory circuit 81.

When the waveform C output from the monostable circuit 77 unblocks the latch circuit 81, the waveforms F(1) to F(n) which are stored in the memory section of the latch circuit are output to the light emitting diodes 82(1) to 82(n). If the engine is running at a slow speed then only the first few light emitting diodes from the first diode 82(1) are lit when the latch circuit 81 is opened. On the other hand, if the engine is running at a high speed a large number of the light emitting diodes are lit. Since they are all arranged in a line, the length of the line is a direct measure of the engine speed, and the panel on the dashboard can be calibrated to read R.P.M. directly.

It will be appreciated that a line of diodes 82 remain lit until there is a variation in engine speed. When this happens the appropriate diode or diodes at the end of the line are either lit or extinguished. Any sudden changes or fluctuations in engine R.P.M. are immediately apparent, since as the device is wholly electronic there is no sluggishness in response due to mechanical damping.

Whilst in the above described embodiment we have used a shift register 76 to give a delay in order not to exceed the maximum duty cycle of the monostable 77, it will be appreciated that this can be achieved with a gated monostable or flip-flop.

It will be appreciated that although the above device has been described in connection with the measurement of engine R.P.M. for automobiles, it could equally well be applied to the measurement of any shaft R.P.M. regardless of the particular type of engine or machinery.

What I claim and desire to secure by Letters Patent is:

1. A device for measuring shaft R.P.M. including: means for generating a voltage of square waveform, having two voltage states and a constant mark space ratio, in synchronism with the shaft revolutions; gate means which cyclically opens to allow passage of the pulses for a predetermined time period irrespective of the speed of rotation of the shaft; a ring counter for counting the pulses passing through the gate in said predetermined time and providing a plurality of outputs; a plurality of visible diodes arranged in equispaced relation from one to the next; and means for connecting said diodes to respective outputs from the ring counter so that the diodes are switched on in sequence from said outputs in accordance with the pulses counted during the time which said gate is open and are switched off again as soon as the next diode in the sequence has been lit so as to cause a line of diodes to appear continuously lit during the cyclic operation, whereby the length of the line of lit diodes is proportional to the shaft R.P.M.

2. A device according to claim 1, wherein the means for generating a voltage of square waveform includes a gallium arsenide lamp for generating infra-red radiation, a photo-transistor sensitive to the infra-red radiation, an element opaque to the infra-red radiation having at least one aperture therein for interrupting the infra-red radiation reaching the photo-transistor, said element being driven in synchronism with the shaft so that said photo-transistor produces a square waveform output, a fast inverse switching trigger located between the output of the photo-transistor and said gate means, and a transistor isolating stage located between the output of said fast inverse switching trigger and said gate means.

3. A device according to claim 1, further including an individual amplifier stage for each of said visible diodes, said amplifier stages being identical, each amplifier stage being arranged between an output of the ring counter and a respective visible diode, each amplifier stage having two transistors arranged in cascade to switch in inverse relation to one another.

4. A device according to claim 3, wherein the visible diodes are gallium phosphide lamps.

5. A device for measuring engine R.P.M. including a source of infra-red radiation; an infra-red detector; an element opaque to infra-red radiation, having at least one aperture therein and driven in synchronism with the engine whose R.P.M. is to be measured for controlling the radiation falling on said detector so that said detector produces a square output having a constant mark to space ratio; means for fast inverse switching the output of the detector to produce a corresponding series of pulses; a clock operated gate means which cyclically opens to allow passage of the pulses for a predetermined time period; a ring counter for counting the pulses passing through the gate during said predetermined time period and providing a plurality of outputs, each of which is energized in turn as a result of the pulse count; a plurality of gallium phosphide lamps; and means for connecting said lamps to a respective output of said ring counter; and means for connecting said lamps in an equi-spaced line in accordance with the sequence of outputs from the ring counter so that the lamps are cyclically lit in sequence at a fast rate, whereby the length of the line of lit lamps represents the speed of rotation of said engine.

6. A device according to claim 5, further comprising an amplifier connected between each output from the ring counter and the respective gallium phosphide lamp, each said amplifier comprising two transistors which switch in inverse relation to one another.

7. A device for measuring shaft R.P.M. including means for generating a voltage of square waveform, having two voltage states and a constant mark space ratio, in synchronism with the shaft revolutions; gate means which is cyclically opened to allow the passage of pulses for a predetermined time irrespective of the speed of rotation of the shaft; means for opening said gate after a given number of pulses following the closing of the gate; means for counting the pulses passing through the gate in a predetermined time and providing a plurality of outputs; a memory circuit for storing the outputs from the counting means; a plurality of visible diodes arranged in equi-spaced relation from one to the next; means for cyclically reading out from the memory circuit the stored plurality of outputs whereby a line of diodes is lit, the length of which is proportional to the shaft R.P.M.

8. A device according to claim 7, wherein said means for cyclically opening said gate includes a first shift register and a first monostable circuit of constant reversion time, the shift register receiving both the incoming voltage of square waveform and a reset input from the monostable circuit, said shift register giving an output to trigger the monostable circuit into its unstable state after a given number of voltage pulses have elapsed following its reset by the monostable circuit on reversion to its stable state, the monostable circuit unblocking the gate for the duration that it remains in the unstable state.

9. A device according to claim 8, including a second shift register constituting the means for counting the pulses passing through the gate, and a second monostable circuit operable from the output of the first monostable circuit for clearing the second shift register at the instant the gate is opened to allow the next series of voltage pulses through the gate.

10. A device according to claim 8, wherein an output from the first monostable circuit effects the read out from the memory circuit to the visible diodes, said cyclic read out being achieved when said monostable circuit reverts to its stable state.

11. A device according to claim 7, wherein the visible diodes are gallium phosphide lamps.

* * * * *